Patented Oct. 6, 1925.

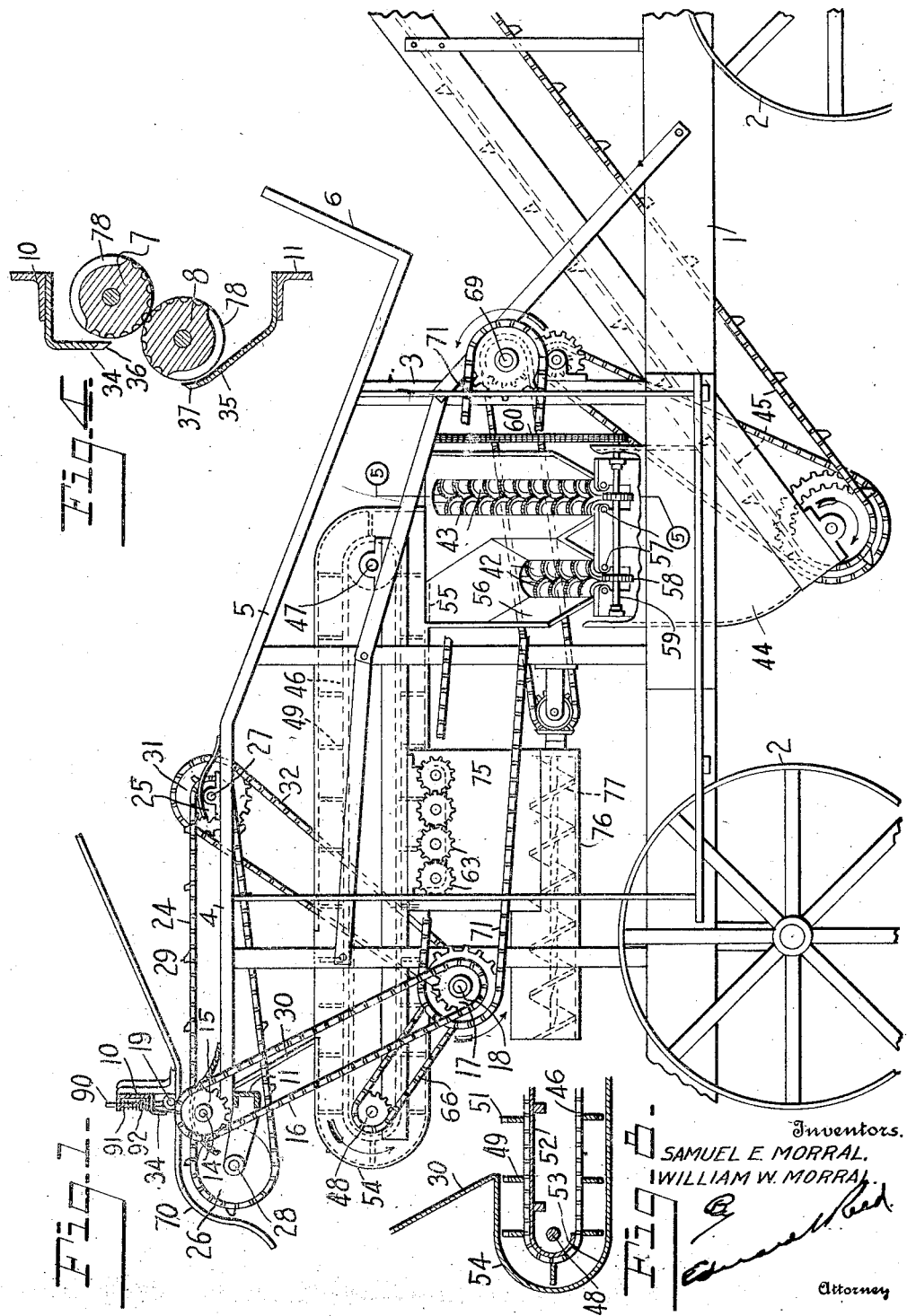

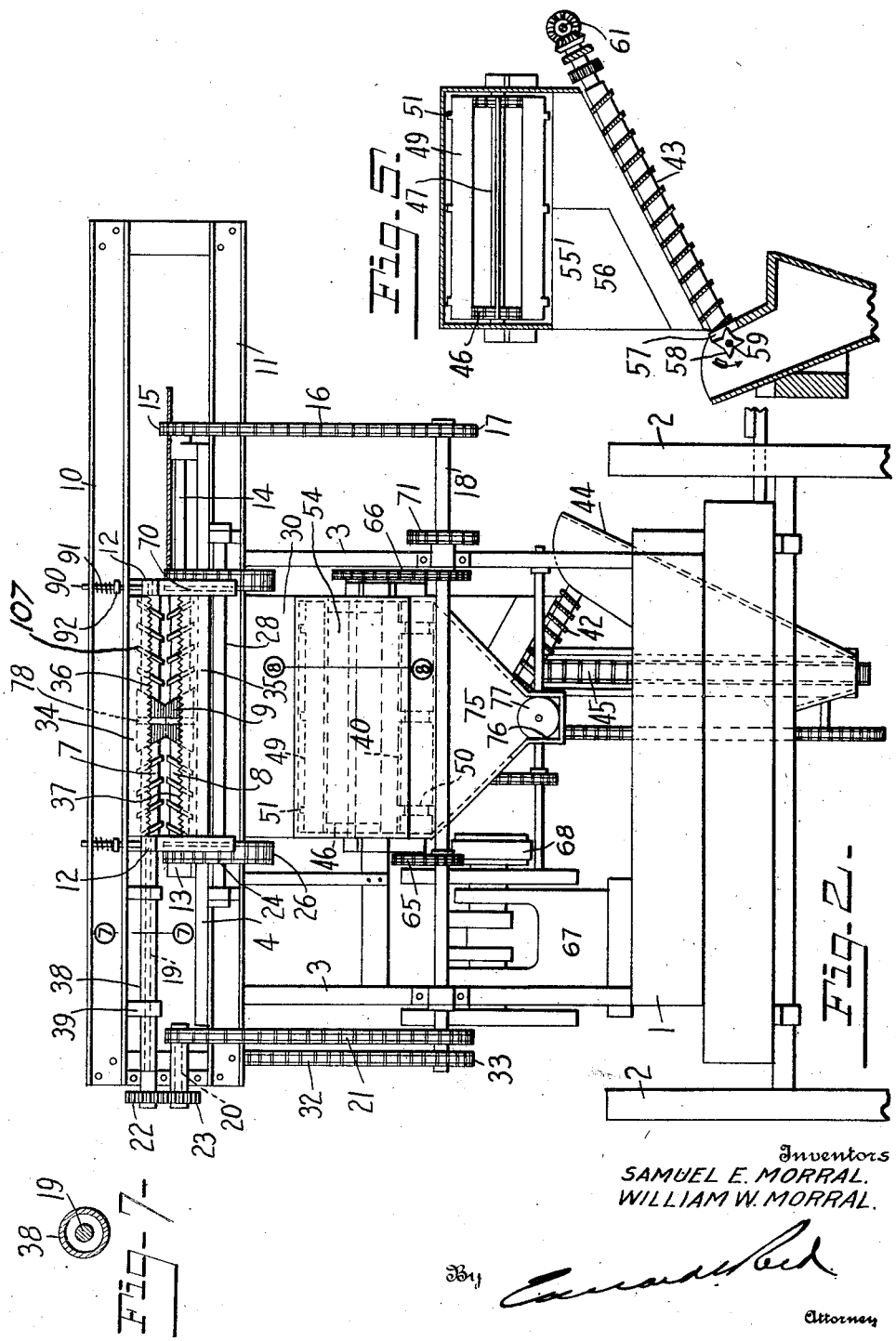

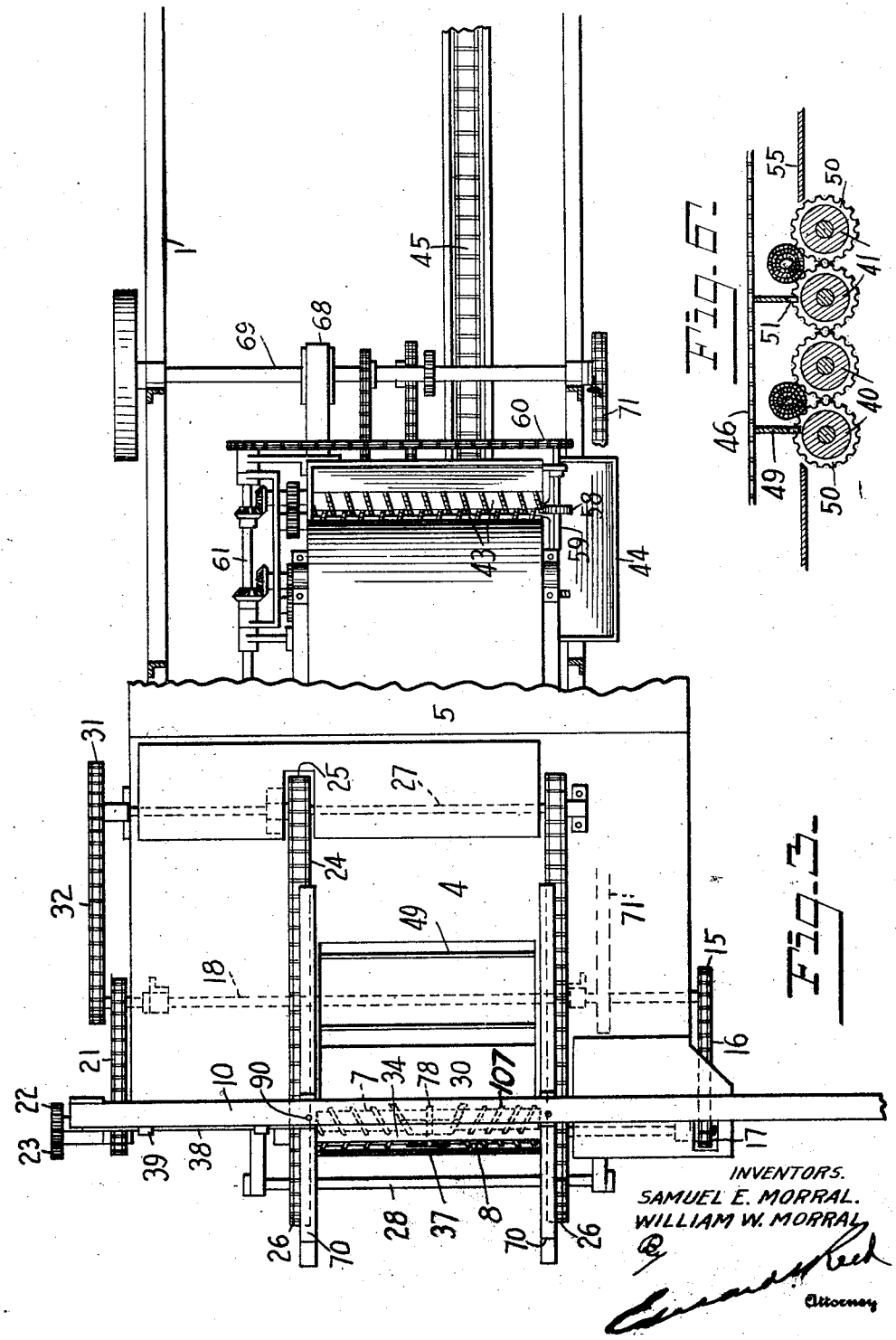

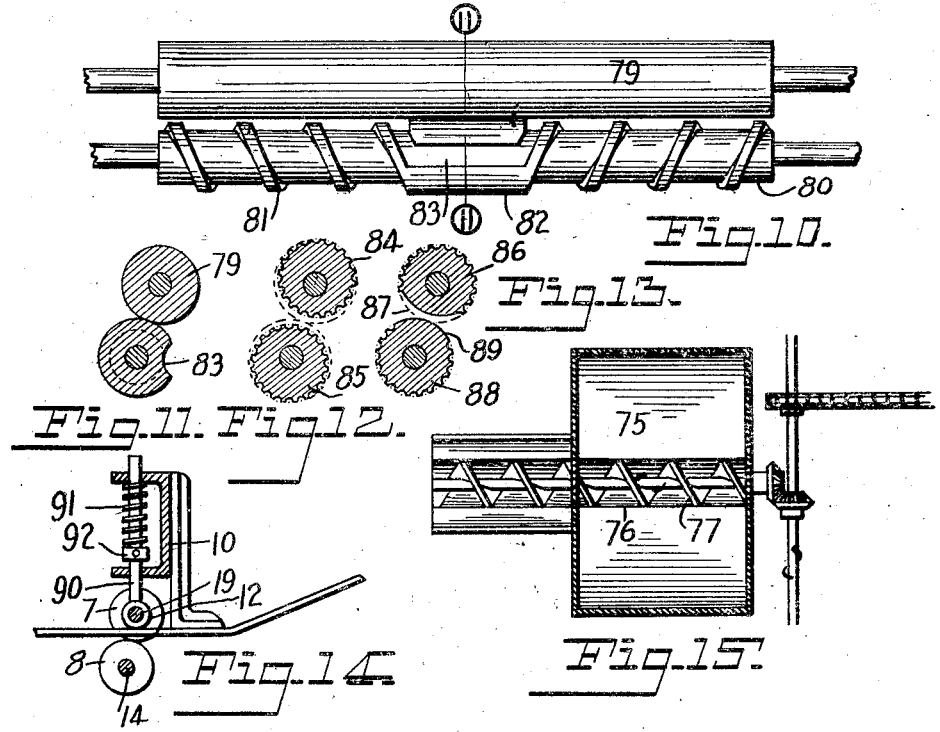
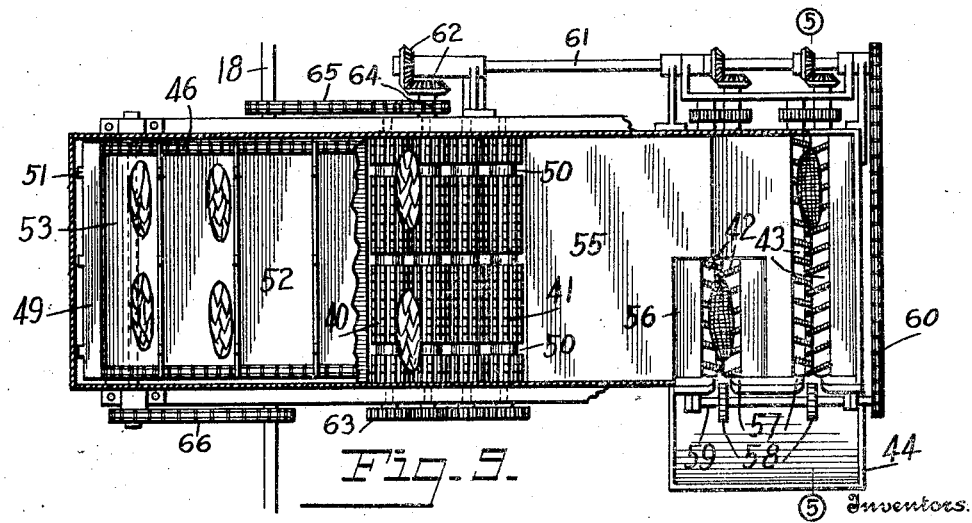

1,556,015

UNITED STATES PATENT OFFICE.

SAMUEL E. MORRAL AND WILLIAM W. MORRAL, OF MORRAL, OHIO.

HUSKING MACHINE.

Application filed November 16, 1922. Serial No. 601,219.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Husking Machines, of which the following is a specification, reference being had therein to the accompanying drawing.

This invention relates to corn husking machines and more particularly to a husking machine for husking corn from the shock which can be moved from shock to shock as the work is accomplished.

One object of the invention is to provide a machine of this character which will feed the stalks of corn to an ear removing device, remove the ear from the stalk and discharge the stalk from the machine in an unbroken condition so that it can be bound into a bundle or again shocked; and which will deliver the ear which is removed from the stalk to husking devices which will remove the husk therefrom and in turn deliver the husked ear to a wagon or other suitable receptacle.

A further object of the invention is to provide a machine of this kind with snapping rollers and means for moving the stalk of corn transversely of its length between the said rollers and to provide said snapping rollers with means to prevent the stalk or the leaves thereon from wrapping about the snapping rollers; and also to provide means for preventing the stalk or the leaves thereon from wrapping about the shafts of the snapping rollers.

A further object of the invention is to provide a machine of this kind in which the stalks will be moved transversely to their length between the snapping rollers and in which the snapping rollers will be of such a character that they will not shell the corn.

A further object of the invention is to provide husking rollers with means for moving the ears across the same and for preventing small ears from lodging between the husking rollers.

A further object of the invention is to provide a husking mechanism having inclined husking rollers along which the ears move by gravity and having means for preventing the ears from lodging between the bearings at the discharge end of said husking rollers.

Other objects of the invention will appear as the mechanism is described in detail.

In the accompanying drawings Fig. 1 is a side elevation, partly broken away, of a machine embodying our invention; Fig. 2 is a rear end elevation of such a machine; Fig. 3 is a top plan view of the same, partly broken away; Fig. 4 is a sectional view taken transversely through the snapping rollers and their guards; Fig. 5 is a sectional view taken on line 5—5 of Fig. 1; Fig. 6 is a sectional view taken transversely through the husking rollers; Fig. 7 is a sectional detail view of one of the snapping roller shafts and its guard; Fig. 8 is a sectional view of a portion of the conveyor leading to the husking rollers; Fig. 9 is a plan view, partly broken away, of the husking rollers and the conveyor leading thereto; Fig. 10 is a detail view of a modified form of snapping roller; Fig. 11 is a sectional view taken on line 11—11 of Fig. 10; Fig. 12 is a sectional view of another form of snapping roller; Fig. 13 is a sectional view of still another form of snapping roller; Fig. 14 is a sectional view showing the yieldable support for the upper snapping roller; and Fig. 15 is a detail view of the husk conveyor.

In these drawings we have illustrated one embodiment of our invention and have shown the same as applied to a portable corn husking machine comprising a frame 1 mounted on wheels 2 and adapted to be moved from shock to shock by any suitable means, as by connecting it with a wagon. Mounted on the frame 1 and extending upwardly therefrom are a plurality of standards or upright frame members 3 on the upper end of which is mounted a table 4 having a forward inclined portion 5 provided with an upturned end 6, which forms a trough or receptacle on which the stalks of corn may be placed and from which they are delivered, preferably by hand, to the horizontal portion of the table 4. Arranged near the rear end of the table 4 is a pair of snapping rollers 7 and 8, which extend transversely to the table and are of such a character that a stalk of corn may pass between them without being crushed. These rollers are provided with ear removing portions which, in the present instance, are arranged near the center thereof, as shown at 9. The snapping rollers may be mounted in any suitable manner but inasmuch as the stalks of corn will extend for a considerable distance beyond each end of the snapping rollers, we have here shown at the rear end of the table a transverse frame consisting of an upper member 10 and a lower member 11, these members being spaced apart throughout their length and connected one to the other at their ends so as to provide a rigid support for the snapping rollers and to permit the stalks of corn to pass transversely through the same. As here shown, the upper snapping roller 7 is mounted in bearings 12 rigidly secured to the upper transverse frame member 10, while the lower snapping roller 8 is mounted in bearings 13, carried by the lower frame member 11. The lower snapping roller is carried by a shaft 14 on which is mounted a sprocket wheel 15 which is driven through a sprocket 17 on a counter shaft 18 mounted on the rear upright members 3 of the main frame. The upper snapping roller 7 is driven from the shaft 18 and to avoid interfering with the passage of the stalks of corn between the rollers the shaft 19 of the upper roller is extended laterally and mounted in a bearing at the end of the transverse frame. A short shaft 20 is also mounted at the end of the transverse frame and is driven by sprocket chain 21 from the shaft 18. The shafts 19 and 20 are connected one to the other by gears, 22 and 23, thereby causing the upper roller to be rotated in a direction opposite that in which the lower roller is rotated.

Preferably one of the rollers is yieldable with relation to the other and, as here shown, the bearings for the upper roller 9 are carried by rods 90 slidably mounted in the upper member 10 of the transverse frame. Springs 91 coiled about the rods 90 between the upper flange of the frame member and collars 92, exert downward pressure upon the rods and the roller and hold the roller normally in its operative position but will yield under heavy pressure to permit the upward movement of the roller.

We have also provided means for delivering the stalks one at a time to the snapping rollers, which means is preferably in the form of a conveyor to move the stalks along the table 4 and to present the same to the snapping rollers in a position parallel to said rollers. In the present construction this conveyor consists of two sprocket chains 24 mounted on sprocket wheels 25 and 26, carried by shafts 27 and 28, journaled in suitable bearings beneath the table 4. The sprocket wheels extend through openings in the table and the upper stretches of the chains 24 are arranged above and close to the table and are provided with projections or teeth 29 to engage the stalks and move them toward the snapping rollers. It will be noted that the sprocket wheels 26 lie rearwardly beyond the snapping rollers and that the upper stretches of the conveyor chains extend between the rollers, thus positively moving each stalk of corn between the rollers. To insure the proper discharge of the stalks from the machine we have arranged above each of the sprocket wheels 26, a guard 70 which will retain the stalks in engagement with the conveyor until they have reached the point of discharge. These guards, or guide strips, extend rearwardly from the transverse frame and are preferably mounted on the bearing brackets which support the upper snapping roller. They extend rearwardly and are then curved downwardly about the rear portions of the sprocket wheels and are spaced from the sprocket wheels and chain such a distance that they will not engage the teeth of the sprockets on the conveyor but will retain the stalks of corn in engagement therewith, thus holding the stalks against displacement and causing them to be delivered at the desired point and in the desired position. The end portions of the snapping rollers are spaced apart a distance sufficient for the stalks to pass between them without crushing and the ear removing portions of the rollers are relatively narrow and are provided with means for feeding the stalks between them and for snapping the ears therefrom. Consequently it is necessary to provide means for shifting the stalks lengthwise of the rollers when the ears do not come in contact with the ear removing portions thereof. To this end one or both of the snapping rollers may be provided, at the end or ends of the ear removing portions, with spiral ribs 107 which will engage the butt of the ear on the stalk which has been moved between the rollers and will move the ear, and consequently the stalk to which it is connected, lengthwise of the stalk and in a direction parallel with the rollers until the ear engages the ear removing portions of the rollers, which will remove the ear from the stalk, permitting the ear to drop into a chute 30 which leads to the husking rollers. The conveyor 24 carries the stalk to the rear end of the table and discharges it either onto a pile of stalks or to a binding mechanism. The conveyor or feeding device for moving the stalks to the snapping rollers may be driven in any suitable manner but, as here shown, the shaft 27 has secured thereto a sprocket wheel 31 which is driven by a sprocket chain 32 extending about a sprocket wheel 33 on the shaft 18.

As the stalks of corn are moved between the snapping rollers and their shafts, particularly when the stalks are moved lengthwise of the rollers, there is sometimes a tendency for the leaves on the stalks or the stalks themselves to wrap about the rollers or their shafts and when this wrapping action has begun it is apt to continue until the rollers are choked down and the machine rendered inoperative. To avoid this wrapping of the leaves and stalks about the rollers we have provided the rollers with guards which, in the present instance, are in the form of metal strips, 34 and 35, secured, respectively, to the upper and lower members, 10 and 11, of the transverse frame which carried the snapping rollers. These guards, which extend lengthwise of the rollers, are curved about the upper and lower portions, respectively, of the rollers and are provided with toothed edges, 36 and 37, arranged close to but out of engagement with the respective rollers, which edges will engage the leaves and stalks and prevent the same from wrapping about the rollers. To prevent the leaves and stalks from wrapping about the shafts, beyond the ends of the snapping rollers, these shafts may be encased in tubular guards 38 which extend about the shafts, between the bearings therefor, and are held against rotation with the shaft, preferably by brackets 39 which are secured to the tubular guards and to the members of the transverse frame.

As has been stated the ears of corn are snapped from the stalks and drop away from the snapping rollers, the lower roller preferably having its axis in a plane slightly in the rear of the axis of the upper roller, as shown in Fig. 4, which permits the ear to drop freely away from the rollers. The husking rollers may be of any suitable character and may be arranged in any suitable manner with relation to the main frame and the snapping rollers. In the present construction we have shown a plurality of pairs of husking rollers, some of which are horizontal, and some of which are inclined, and have shown these husking rollers as extending transversely to the machine. As here shown, we have employed two pairs of horizontal husking rollers, 40 and 41, and have also employed two pairs of inclined husking rollers, 42 and 43. The ears of corn are first moved across the horizontal husking rollers which remove the rough outer husk therefrom and are then delivered to the inclined rollers which remove any portion of the husk which may not have been removed by the horizontal rollers, the ears moving by gravity down the inclined rollers, from which they are discharged to a chute 44 which delivers them to a conveyor 45 by which they are conveyed to the bed of the wagon with which the machine is connected or to any other suitable receptacle. It is necessary to provide some means for moving the ears transversely across the horizontal husking rollers and we prefer to employ for this purpose an endless belt or conveyor which may consist of sprocket chains 46 extending about sprocket wheels mounted on the shafts, 47 and 48, and having its lower stretch arranged above and extending transversely to the several horizontal husking rollers. Carried by the chains 46 and extending between the same are a series of cleats or "flights" 49 which engage the ears and drag them across the husking rollers. The edges of these cleats must clear the tops of the rollers and it sometimes happens that a small ear will lodge in the space between the two husking rollers and will extend such a short distance above the surface of the rollers that the cleats will not engage the same with sufficient force to dislodge it but will pass over the same, thus leaving the ear in the husking rollers, in which position it prevents other ears from being acted upon by this pair of rollers. In order that such an ear may be dislodged from the husking rollers and carried on across the same, we have shown the rollers as provided with a plurality of circumferential grooves 50 and have provided the cleats 49 with teeth or projections 51 which will enter the respective grooves in the husking rollers as the cleats are carried across the same, and these projections will extend into the rollers to such a depth that they will engage and dislodge any ear which may lodge between the rollers. The ears of corn which are removed from the stalks are delivered to the conveyor by the chute 30 and in order that the ears may be delivered to the husking rollers in the proper position in relation thereto, it is preferable that they should be delivered to the upper stretch of the conveyor. We have therefore shown the upper stretch of the conveyor as moving over a table 52, the rear end of which is curved about the axis of the shaft 48 and extends to a point below that shaft. Mounted below the conveyor and leading to the husking rollers is a table 53, the rear end of which curves upwardly and forwardly, as shown at 54, and is spaced some distance from the curved end of the table 52 to provide a passageway in which the cleats of the conveyor may travel. The forwardly extending upper end of the table 53 terminates a short distance in front of the shaft 48 and the ears of corn are delivered by the chute 30 onto the table 52 in front of this end of the member 54. The ears fall between the successive cleats on the conveyor and as they are moved by the conveyor into the passageway formed between the guides, 52 and 54, they will move by gravity against the lowermost cleat and will thereby assume a position transverse to the conveyor. As the conveyor continues its movement through the passageway the ear will move by gravity onto the horizontal portion of the table 53 and will then be engaged by the following cleat which will move it along the table to the husking rollers. Should an ear of corn when delivered to the conveyor, extend crosswise of one of the cleats it will be dislodged therefrom by contact with the forward end of the curved member 54 of the passageway, which will push it off the cleat and into the space between the two cleats.

As the ears of corn leave the husking rollers 41 they are moved by the conveyor 46 over a table 55 to the husking rollers, 42 and 43. One side of the table 55 is cut away to provide a discharge opening to the rollers 42, as shown at 56, and the other side of the table extends beyond the rollers 42 so that the ears will be discharged therefrom over the rollers 43, thus dividing the ears between the two sets of rollers. The ears move by gravity down the inclined rollers, 42 and 43, and are discharged from the lower ends thereof into the chute 44. The rollers 42 and 43, are journaled at their lower ends in bearings 57 which are spaced a short distance apart to permit the ears to pass from the rollers. It sometimes happens, however, that a small ear will lodge between these bearings and thus interfere with the discharge of the following ears. We have therefore mounted at the lower end of each pair of inclined husking rollers an ejector which will engage and dislodge any ear which may wedge between the bearings. In the present instance, this ejector is in the form of a star wheel 58 mounted on a shaft 59 which extends transversely to the husking rollers just below the bearings 37. The star wheel is of such a diameter that as it rotates the teeth will pass through the space between the bearings 57 and will positively clear that space of any obstruction which may have lodged therein. It is desirable that the ejector should exert an upward pressure on the lodged ear, as it will thus be more readily dislodged. This may be accomplished by arranging the axis of the ejector near the ends of the bearings or below the bearings so that the teeth will move upwardly between the bearings. The shaft 59 may be rotated in any suitable manner, but in the present instance, it is driven by a sprocket chain 60 from a shaft 61 which drives the husking rollers. The husking rollers are driven from the shaft 61 through bevel gearing, the rollers being geared one to the other by spur gearing in a well known manner. The shaft 61 extends beyond the inclined rollers, 42 and 43, and is connected by bevel gearing 62 with the shaft of one of the horizontal husking rollers 41. This husking roller is driven by spur gearing 63 from its companion roller which has secured thereto a sprocket wheel 64 which is driven by a chain 65 from a sprocket wheel on the shaft 18. The conveyor 46 may be driven in any suitable manner, but as here shown, it is driven by a sprocket chain 66 which extends from the counter shaft 18 to the shaft 48. The counter shaft may be driven from any suitable source of power but the machine as here shown, is self-contained and we have shown an internal combustion engine 67 mounted upon the frame 1 and connected by a belt 68 with a shaft 69 near the forward end of the frame 1 and this shaft is connected by a sprocket chain 71 with the counter shaft 18.

It is also desirable that some means should be provided for disposing of the husks which are removed from the ears and which drop from the husking rollers. To this end we have provided beneath the horizontal husking rollers a hopper 75 arranged to receive the husks from the rollers and having at its bottom a trough shaped portion 76 in which is mounted a spiral conveyor 77. The trough shaped portion of the conveyor extends rearwardly and discharges the husks at the rear end of the machine or at any other suitable point, the husks being preferably deposited along with the corn stalks.

The snapping rollers themselves may take various forms but we prefer that they shall be of such a character and so arranged that when the rollers are in one position a space will be provided between the ear removing portions thereof to permit the passage of a stalk of corn and when the rollers are in another position the opposed surfaces thereof will engage the stem of the ear of corn and remove the ear from the stalk. As shown in Fig. 4 the ear removing portions of the rollers are provided on one side with roughened surfaces and, in the present instance, these surfaces are provided with longitudinal ribs. On the other sides of their axes the ear removing portions of the rollers have parts the radii of which are of less length than the radii of the roughened portions of the rollers, thus when the last mentioned portions of the rollers are moved into positions adjacent to one another a recess will be provided between the rollers to permit of the passage of a stalk of corn but when the roughened portions are brought adjacent one to the other the stem of the ear will be gripped between them and the ear pinched from the stalk. Preferably the ear removing portions are provided with circumferential portions or bands 78 which contact one with the other to hold the roughened portions of the rollers out of contact one with the other.

In Figs. 10 and 11, we have shown a modified form of the husking rollers in which the upper roller 79 is cylindrical throughout its length and the lower roller 80 is provided at its end portions with spiral ribs 81 and has an intermediate ear removing portion 82. This ear removing portion is of a smooth cylindrical shape but has on one side a longitudinally extending part of short radius which forms the recess 83 through which the stalk of corn may pass. Further modifications of the snapping rollers are shown in Fig. 12 where the upper and lower rollers, 84 and 85, both have their ear removing portions provided throughout their circumference with longitudinal extending ribs and the rollers are both mounted eccentrically so that in one position a space will be provided between them and in the other position their surfaces will cooperate to remove the ear. In Fig. 13 the upper snapping roller 86 has a portion of the surface roughened and has a portion of its surface cut away as shown at 87 to form a recess, while the lower roller 88, has its corresponding portion, 89, smooth and of the same radius as the other portions thereof.

The operation of the device will be readily understood from the foregoing description and it will be apparent that we have provided a portable corn husking machine which will operate very effectively and very rapidly to separate the ears from the stalks of corn, deliver the stalks from the machine in an unbroken condition, husk the ears and deliver them to a conveyor which will carry them to the desired receptacle. The mechanism is so constructed and guarded that the stalks of corn or the leaves thereon cannot wrap about the snapping rollers or their shafts, and the ears cannot lodge between the husking rollers or between their bearings and consequently there is little or no possibility of the machine being choked down or rendered in part inoperative by the failure of the corn stalks or the ears to pass through the same in the proper manner. The machine is very simple in its construction and is easily operated. By connecting the same with a wagon it can be readily moved from one shock to another and the corn, when husked, delivered by the conveyor to the wagon.

While we have shown and described one embodiment of our invention we wish it to be understood that we do not desire to be limited to the details thereof as various modifications may appear to one skilled in the art.

Having now fully described our invention what we claim as new and desire to claim by Letters Patent, is:

1. In a machine of the character described, a pair of snapping rollers, means for feeding a stalk of corn between said rollers, and a guard arranged lengthwise of and extending partially about one of said rollers and having one edge provided with pointed teeth and arranged adjacent to the surface of said roller to prevent the corn stalks and the leaves thereon from wrapping about said roller.

2. In a machine of the character described, snapping rollers arranged to permit a stalk of corn to pass between them, means for moving a stalk of corn transversely to its length between said rollers, said rollers having means to remove the ear from said stalk, and a guard extending lengthwise of one of said rollers and having one edge provided with relatively small pointed teeth, and arranged adjacent to, but out of contact with, said roller.

3. In a machine of the character described, a pair of snapping rollers, means for moving a stalk of corn transversely to its length between said rollers, said rollers having means to remove the ear from said stalk, and guards extending lengthwise of the respective rollers, each of said guards having one longitudinal edge provided with pointed teeth and arranged adjacent to the surface of one of said rollers.

4. In a machine of the character described, snapping rollers arranged to permit a stalk of corn to pass between the same, means for moving a stalk of corn transversely to its length between said rollers, said rollers having means to remove the ear from said stalk, one of said rollers having a shaft extending beyond the end thereof, and a tubular guard mounted about said shaft and held against rotation therewith.

5. In a machine of the character described, a pair of snapping rollers, means for feeding a stalk of corn between said rollers, a guard arranged lengthwise of and extending partially about one of said snapping rollers and having a toothed edge arranged adjacent to the surface of said roller to prevent the corn stalks and the leaves thereon from wrapping about said roller, one of said rollers having a shaft extending beyond the end thereof, and a pipe mounted about said shaft and held against rotation therewith.

6. In a machine of the character described, a pair of husking rollers each having a circumferential groove, the groove in one roller being in alinement with the groove in the other roller, a conveyor movable transversely to said rollers to move an ear of corn across the same, and a projection carried by said conveyor to extend into said grooves as said conveyor passes over said rollers.

7. In a machine of the character described, a pair of husking rollers each having a circumferential groove, the groove in one roller being in alinement with the groove in the other roller, an endless conveyor movable transversely of said rollers and having cleats to engage the ears and move them across said rollers, and said cleats having projections arranged to extend into said grooves as the cleats move across the rollers.

8. In a machine of the character described, a pair of husking rollers each having a plurality of circumferential grooves, the grooves in one roller being in alinement with the corresponding grooves in the other roller, a table leading to said husking rollers, an endless conveyor extending transversely to said husking rollers and having cleats arranged to travel over said table and across said husking rollers, and each of said cleats having a projection arranged to extend into the respective grooves as the cleat moves across said rollers.

9. In a machine of the character described, a pair of husking rollers, bearings for the discharge ends of said rollers, said bearings being spaced apart, and an ejector rotatably mounted on an axis arranged below said bearings and having a part which moves upwardly between said bearings to dislodge the ears of corn which may have lodged between the same.

10. In a machine of the character described, a pair of husking rollers, bearings for the ends of said rollers, said bearings being spaced apart, and a toothed wheel rotatably mounted on an axis extending transversely to said husking rollers and so arranged that its teeth will pass between said bearings.

11. In a machine of the character described, a pair of inclined husking rollers, bearings for the lower ends of said rollers, said bearings being spaced apart, a shaft mounted beneath said bearings and transversely to said husking rollers, and an ejector carried by said shaft and having parts arranged to pass between said bearings when said ejector is rotated.

12. In a machine of the character described, a pair of horizontal husking rollers each having a circumferential groove, the groove in one roller being in alinement with the groove in the other roller, a conveyor extending transversely to said rollers and having cleats to move an ear of corn across the same, said cleats having projections to extend into said grooves, a pair of inclined husking rollers to receive the ears from said horizontal husking rollers, bearings for the lower ends of said inclined rollers, said bearings being spaced apart, and an ejector rotatably mounted beneath said bearings and movable through the space between the same.

13. In a machine of the character described, a pair of snapping rollers arranged to permit a stalk of corn to pass between them, means for moving a stalk of corn transversely to its length between said rollers, said rollers having means to remove said ear from said stalk, a guard extending lengthwise of one of said rollers and having a toothed edge arranged adjacent to, but out of contact with said roller, husking rollers to receive the ears from said snapping rollers, each of said husking rollers having a circumferential groove, the groove in one roller being in alinement with the groove in the other roller, a conveyor arranged transversely of said husking rollers and having cleats to move the ears across said rollers, said cleats having projections to extend into said grooves, a pair of inclined husking rollers to receive the ears from the first mentioned husking rollers, bearings for the lower ends of said husking rollers, said bearings being spaced apart, and an ejector rotatably mounted adjacent to said bearings and having parts movable between the same to dislodge ears of corn which may lodge between said bearings.

14. In a machine of the character described, a pair of snapping rollers arranged to permit a stalk of corn to be passed between the same, and having means for removing an ear from said stalk, conveyor chains extending transversely to and beyond said snapping rollers to carry said stalk of corn between the same, and guards extending rearwardly and downwardly about the rear ends of said conveyor chains.

15. In a machine of the character described, a main frame, a pair of snapping rollers arranged to permit a stalk of corn to pass between them and having means for removing an ear from said stalk, a pair of sprocket wheels mounted on said main frame on each side of said snapping rollers, conveyor chains extending about the respective sprocket wheels of the two pairs of sprocket wheels and extending transversely to said snapping rollers, and guards mounted above each of said conveyor chains and extending rearwardly and downwardly about the respective sprocket wheels on the rear side of said snapping rollers.

16. In a machine of the character described, a pair of snapping rollers, means for presenting a stalk of corn to said rollers in a position substantially parallel therewith, and for moving said stalk transversely to its length between said rollers, said rollers having ear removing portions so shaped and arranged that when said rollers are in one position a space will be provided between the rollers for the passage of the stalk and when the rollers are in another position, said ear removing portions will cooperate to remove the ear from the stalk, and said ear removing portions having circumferential parts contacting one with the other to hold said ear removing portions of said rollers out of contact one with the other.

17. In a machine of the character described, a pair of snapping rollers, means for presenting a stalk of corn to said rollers in a position substantially parallel therewith, and for moving said stalk transversely to its length between said rollers, said rollers having ear removing portions provided with rough surfaces and also having circumferential bands contacting one with the other to hold said roughened surfaces out of engagement.

18. In a machine of the character described, a pair of snapping rollers, a conveyor moving transversely to said snapping rollers and adapted to move a stalk of corn transversely to its length between said snapping rollers, and guards extending over said conveyor beyond said snapping rollers to retain the stalks of corn in engagement therewith.

19. In a machine of the character described, a main frame, snapping rollers rotatably mounted on said main frame, conveyor chains extending between said snapping rollers, and guards carried by the said main frame and extending rearwardly and downwardly about the respective conveyor chains to retain the stalks of corn in engagement therewith.

20. In a machine of the character described, snapping rollers, means for moving stalks of corn between said snapping rollers in a position substantially parallel therewith and discharging the stalks at the rear of said machine, husking rollers to receive the ears of corn from said snapping rollers, a hopper arranged beneath said husking rollers to receive the husks therefrom, and a conveyor arranged at the bottom of said hopper to move said husks to the rear of the machine and discharge the same in a pile with said stalks.

21. In a machine of the character described, a main frame, a pair of snapping rollers carried by said main frame, means for presenting the stalk of corn to said rollers in a position substantially parallel therewith and for moving same between said rollers, said snapping rollers having ear removing portions to remove the ear from said stalk, husking rollers carried by said main frame and arranged substantially parallel with said snapping rollers, means for delivering the ears from said snapping rollers to said husking rollers, a hopper arranged beneath said husking rollers and having a trough shaped portion at the bottom thereof extending toward the rear of said machine, and a conveyor mounted in the trough shaped portion of said hopper.

22. In a machine of the character described, snapping rollers, means for moving stalks of corn between said snapping rollers in positions substantially parallel therewith and discharging stalks at the rear of said machine, husking rollers to receive the ears of corn from said snapping rollers, a hopper arranged beneath said husking rollers to receive the husks therefrom and having a trough shaped lower portion provided with a discharge opening at one end, said trough shaped portion of said hopper being rectangular in cross section, and a spiral conveyor mounted in said trough shaped portion of said hopper to move said husks to the rear of said machine and discharge the same in a pile with said stalks.

23. In a machine of the character described, snapping rollers, a conveyor arranged below said snapping rollers to receive an ear of corn therefrom and comprising a series of transverse flights, and a chute leading from the said snapping rollers to said conveyor and arranged to cause the ears to be deposited on said conveyor substantially parallel with said flights.

24. In a machine of the character described, snapping rollers, a conveyor arranged below said snapping rollers to receive the ears therefrom and comprising a series of transverse flights of a height greater than the thickness of an ear of corn, and a chute leading from said snapping rollers to said conveyor and having its lower edge arranged adjacent to and substantially parallel with the edges of said parallel flights.

25. In a machine of the character described, a pair of snapping rollers, one of said rollers comprising a portion having a smooth peripheral surface and provided with a longitudinal recess to permit a stalk of corn to pass between said rollers in a position substantially parallel therewith.

26. In a machine of the character described, a pair of snapping rollers, one of said rollers comprising a portion having a smooth peripheral surface and provided with a longitudinal recess to permit a stalk of corn to pass between said rollers in a position substantially parallel therewith, and also having means to move said stalk of corn lengthwise of said rollers to cause the ear to be properly positioned with relation thereto.

27. In a machine of the character described, a pair of snapping rollers, one of said rollers comprising a portion having a smooth peripheral surface and provided with a longitudinal recess to permit a stalk of corn to pass between said rollers in a position substantially parallel therewith, and the other of said rollers having a circumferential portion cooperating with said portion of the first mentioned roller and having its peripheral surface smooth throughout its circumference.

28. In a machine of the character described, a pair of snapping rollers, one of said rollers comprising an intermediate circumferential portion provided with a longitudinal recess to permit a stalk of corn to pass between said rollers in a position substantially parallel therewith, said roller also having spiral ribs to engage an ear of corn on said stalk and move the stalk lengthwise of said rollers to bring the ear into contact with said intermediate portion, and the other of said rollers having a smooth cylindrical surface throughout its length.

29. In a machine of the character described, a pair of snapping rollers, one of said rollers comprising an intermediate circumferential portion having a smooth peripheral surface and provided with a longitudinal recess to permit a stalk of corn to pass between said rollers in a position substantially parallel therewith, said roller also having spiral ribs to engage an ear of corn on said stalk and move the stalk lengthwise of said rollers to bring the ear into contact with said intermediate portion, and the other of said rollers having a smooth cylindrical surface throughout its length.

In testimony whereof, we affix our signatures hereto.

SAMUEL E. MORRAL.
WILLIAM W. MORRAL.